US006976571B2

(12) United States Patent
Schöps et al.

(10) Patent No.: US 6,976,571 B2
(45) Date of Patent: Dec. 20, 2005

(54) COMB PLATE FOR PEOPLE MOVER

(75) Inventors: Karl-Friedrich Schöps, Berlin (DE); Andreas Mortiz, Berlin (DE)

(73) Assignee: Otis Elevator Company, Farmington, CT (US)

( * ) Notice: Subject to any disclaimer, the term of this patent is extended or adjusted under 35 U.S.C. 154(b) by 247 days.

(21) Appl. No.: 10/343,695

(22) PCT Filed: Jul. 30, 2001

(86) PCT No.: PCT/US01/21584

§ 371 (c)(1),
(2), (4) Date: Jan. 31, 2003

(87) PCT Pub. No.: WO02/10041

PCT Pub. Date: Feb. 7, 2002

(65) Prior Publication Data

US 2004/0035675 A1 Feb. 26, 2004

(30) Foreign Application Priority Data

Jul. 31, 2000 (DE) ........................................ 100 37 172

(51) Int. Cl.[7] ................................................ B65G 15/00

(52) U.S. Cl. ....................................... 198/323; 198/325

(58) Field of Search ................................ 198/323, 325, 198/327

(56) References Cited

U.S. PATENT DOCUMENTS

| | | | | |
|---|---|---|---|---|
| 4,800,998 A | | 1/1989 | Myrick | |
| 5,096,040 A | * | 3/1992 | Wente et al. | 198/323 |
| 5,236,075 A | * | 8/1993 | Bartmann | 198/323 |
| 5,255,771 A | | 10/1993 | Nurnburg et al. | |
| 5,611,417 A | | 3/1997 | Stawniak et al. | |
| 6,241,070 B1 | | 6/2001 | Loder | |
| 6,267,219 B1 | * | 7/2001 | Spannhake et al. | 198/323 |
| 6,601,688 B1 | * | 8/2003 | Stoxen | 198/323 |
| 6,666,319 B2 | * | 12/2003 | Balzer-Apke et al. | 198/323 |

FOREIGN PATENT DOCUMENTS

| | | |
|---|---|---|
| DE | 2 135 864 | 1/1973 |
| DE | 299 07 184 U1 | 4/1999 |
| DE | 198 55 023 A1 | 6/2000 |
| JP | 07-25575 A | 1/1995 |

* cited by examiner

*Primary Examiner*—Joe Dillon, Jr.

(57) ABSTRACT

A comb plate (2) for a people mover with a step belt, having a base plate and a number of teeth (4) applied to one side of it, arranged essentially parallel to one another, which mesh in use with grooves in a people mover, whereby the comb plate (2) has an upper side that is exposed and a lower side that is concealed in use, characterized by the fact that an electric tooth-break monitoring device (6) is provided.

14 Claims, 3 Drawing Sheets

COMB PLATE FOR PEOPLE MOVER

The present invention concerns a comb plate for a people mover with a step belt, having a base plate and a number of teeth arranged on one side of it, essentially parallel to one another, which mesh in use with grooves provided in the step belt, whereby the comb plates have an upper side that is exposed and a lower side that is concealed in use.

BACKGROUND OF THE INVENTION

Comb plates of this kind are used, for example, in escalators or moving sidewalks. They prevent objects, such as clothing articles, shoes, or even body parts of traveling guests from being taken along and crushed at the place where the step belt "disappears" in operation. For this purpose, teeth or prongs are provided, which mesh with corresponding grooves in the step belt. The teeth are beveled in such a way that move an object carried along with the step belt away and thus prevent it from being caught or crushed.

The step belt is the area of the people mover that moves the people. On it, along the exposed surface of the path of movement, the traveling guests are carried along, walking or standing. In an escalator, the step belt is also called a stair belt. This stair belt consists of several stair steps connected to one another, on the upper side of which grooves are provided. In moving sidewalks, the step bands have plate bodies connected to one another; the step band is also called a plate belt. The plates also have grooves on their upper side to mesh with the comb plate. Moving sidewalks are also known in which the step band consists of a relatively elastic material, for example a reinforced plastic material, running essentially along the entire step band, i.e. in step bands of this kind, there are no slits between individual plate bodies or stair bodies.

Comb plates consists, for example, of cast tin or cast aluminum and have about 80 teeth in each case, about 2 mm wide and 4 cm long. The teeth of the comb plate are relatively small and are subject to breakage. Legal standards, for example European standard EN 115 for the people mover mentioned, require regular checking of the people mover, for example weekly or daily. Thus a daily checking of the teeth according to EN 115 requires a "superintendent." According to EN 115, a people mover must no longer be operated if two directly adjacent teeth are broken. These required regular inspections make operation much more expensive. Thus, for example, the superintendent requires training. In addition, he has to be paid for his activities. Whereas functional inspections of the essentially different electrical and mechanical components of an escalator or moving sidewalk can be made by remote monitoring (REM—Remote Escalator Monitoring), checking for breakage of the teeth of the comb plate has so far required the physical presence of a control person.

The task of the present invention is therefore to provide a people mover with a comb plate or a comb plate in which the physical presence of a control person is not required.

SUMMARY OF THE INVENTION

This task is accomplished according to the invention by providing an electric tooth-break monitoring device.

The monitoring device is constructed advantageously in such a way that a warning signal is generated when two adjacent teeth are broken. It is favorable to construct the tooth-break monitoring signal in such a way that a first warning signal can be generated as a maintenance signal when a tooth breaks and a second warning signal can be generated as a stop signal in case two adjacent teeth break, which interrupts operation of the system. A third warning signal can also be generated when, for example, 3 or more non-adjacent teeth break, so that the comb plate can be replaced preventively.

The monitoring device has advantageously at least a first conducting path, advantageously on the lower side of the comb plate, which goes at least through the region of a tooth that is in danger of breaking. The conducting path can also be provided, for example, in an indentation or a hollow space in the comb-plate tooth or cast into the tooth. The conducting path is favorably a flat element, similar to a conducting path, that has low independent stability and breaks off easily, for example in case a tooth breaks, and thus prevents current from flowing through the line. The concept of conducting path is to be viewed in a broad manner. Although a flat conductor is preferred for reasons of production technology, a non-flat line, for example a wire, can also be involved, the latter especially when the conducting path goes essentially through the entire length of the tooth, in order to detect break damage at the extreme ends of the tooth. A tooth typically does not break at its extreme end, but preferentially between the base of the tooth and the extreme end. For reliable monitoring of breakage, it is required that the conducting path run through this region of the comb-plate teeth most susceptible to breakage.

Conducting paths are provided advantageously through all teeth of the comb plate.

A monitoring circuit is provided advantageously, which is connected to at least one conducting path. For monitoring of breakage, a signal, e.g. a voltage, can be applied to the conducting paths, which is given or not given to the monitoring circuit in case a conducting path or a tooth is damaged. If this monitoring circuit detects the breakage of a tooth, for example, or breakage of 3 or more non-adjacent teeth, then it generates a warning signal that is transmitted, for example, to a remote monitoring center or a remote maintenance center. From there, a replacement of this damaged comb plate can be initiated while the people mover can still perform its service. If breakage of another tooth, adjacent to a broken tooth, is detected before the comb plate can be replaced, a stop signal is generated, which stops the operation of the people mover. In addition, the remote monitoring center can also be notified that the people mover has been turned off, if necessary.

A conducting-path rail is also provided advantageously, from which at least one conducting path branches and goes through the region of a tooth that is in danger of breaking and is connected to an evaluation circuit. Advantageously, as many conducting paths branch from the conducting-path rail as there are teeth in the comb plate, each running through the region of a tooth in danger of breaking and connected to an evaluation circuit.

Advantageously, the conducting paths of adjacent teeth are connected to an OR gate for each pair of teeth and the output of the OR gate is connected to an AND gate. If two adjacent teeth are broken, both conducting paths are defective and the voltage applied to the conducting-path rail does not reach the OR gate through either of the adjacent teeth. The OR gate thus becomes logically "false." The outputs of the OR gates are combined through the AND gates. If one of the outputs of the OR gates is logically "false," then the output of the AND gate is also logically "false," and a stop signal is generated.

Alternatively, several conducting paths can be connected advantageously to a signal generator that can generate a characteristic signal for each conducting path, and opposite ends of the conducting paths are connected to an input of an evaluation circuit. The characteristic signal can be, for example, a characteristic voltage, which is established for each tooth. According to the structure, the individual conducting paths can be connected to a common conducting-path rail at the input to the evaluation circuit and thereby the characteristic voltages of the individual teeth can be added. Alternatively, addition of the characteristic voltages can also take place in the evaluation circuit. Comparison of the measured value with the target value for the sum of the characteristic voltages shows whether a tooth is broken or not. By determining the difference between the target value and the actual value, it can be determined which tooth or which teeth is/are broken.

Advantageously, the signal generator is constructed in such a way that at any particular point in time only one signal is given to one conducting path. If no signal comes to the evaluation circuit during the period of the corresponding signal, then the corresponding conducting path has been broken and breakage of this particular tooth is assumed.

A conducting path extends advantageously essentially through the entire length of a tooth. This has the advantage, in comparison with extending only through the region in danger of breaking, that a break can be detected essentially over the entire length of the tooth. This is desirable for reasons of reliable break detection.

Advantageously, a conducting path is glued to the comb plate. In this case, it is especially favorable to glue the conducting path to the comb plate with a flexible film, for example a PCB film. In this way, it is possible, by known processes, for example a photolithographic process, to produce conducting paths on a film and cut the film to correspond to the shape of the comb plate. The film can then be glued to the comb plate and the comb plate is ready for installation after the evaluation circuit has been connected. The film serves favorably in this case as an insulating material for the conducting paths with respect to the conducting material of the comb plate.

Advantageously, the evaluation circuit can also be provided on the film. It can, for example, likewise be applied to the film by a photolithographic process. Alternatively, the evaluation circuits, i.e. the corresponding electronic components on the conducting paths can be connected to the film and attached to the film and glued on with it. It is especially favorable to use so-called SMD (Surface Mounted Device) components and attach them to the film.

The invention also concerns a people mover with a step belt that is characterized by the fact that it has a comb plate according to the invention. It should be pointed out that the present invention is also outstanding in that it is very easy to equip existing systems with this monitoring device through a later conversion. Thus, on the one hand, the possibility exists that existing comb plates can be replaced by comb plates with a monitoring device. Alternatively, the possibility also exists of later equipping comb plates already in use by gluing an appropriate film with a monitoring circuit, which keeps the costs of the conversion low.

The invention will be explained in more detail the following by means of an embodiment example shown in drawings. Here:

BRIEF DESCRIPTION OF THE DRAWINGS

FIGS. 4*a*–4*d* show the production steps for a comb plate according to the invention.

DETAILED DESCRIPTION OF THE PREFERRED EMBODIMENTS

Figure 1:
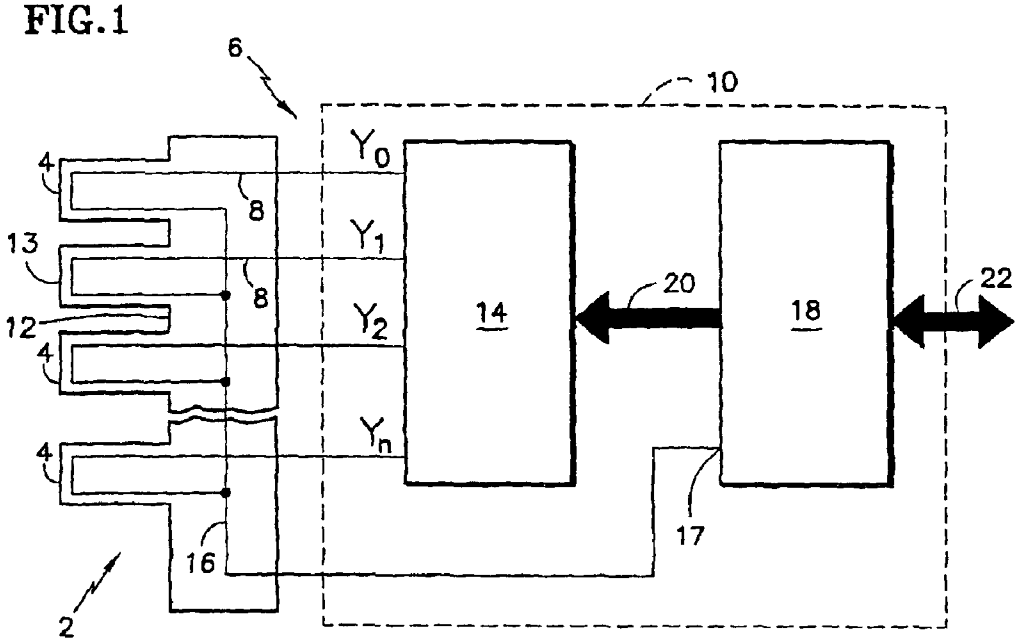
FIG. 1 shows a schematic representation of a comb plate according to the invention with a tooth-break monitoring device.

In FIG. 1, a part of comb plate 2 with teeth 4 is shown, in particular the lower side of the comb plate 2. An electric tooth-break monitoring device 6 can be seen with conducting paths 8 and an evaluation circuit 10 provided on the lower side of the comb plate 2. The conducting paths 8 run essentially along the entire length of the teeth 4 from the base of each tooth 12 to shortly before its front end 13. The conducting paths 8 themselves are of a material with low independent stability. Thus the metal wires or metal films, for example, which can be deposited onto a substrate can be considered as materials for the conducting paths 8, as well as conducting plastic materials.

Breakage of an individual tooth 4 can be checked, for example, by applying a test voltage to one side of a conducting path 8. If the test voltage can be measured at the other end of the conducting path 8, then the conducting path 8 is undamaged and it can be assumed that the tooth 4 is undamaged.

In order to detect whether two adjacent teeth 4 are broken, an evaluation circuit 10 is required, which can be provided on the comb plate 2, for example. Alternatively, lines can also extend outward and outside the comb plate 2, for example connected directly to the control system of the people mover and evaluated by it.

The evaluation circuit 10 shown in FIG. 1 has a signal generator 14 with outputs Y0, Y1, . . . Yn, to each of which a conducting path 8 going to a tooth is connected. There is a total of 2n teeth on the comb plate. The opposite ends of the conducting paths 8 are connected together through a common line 16 to the signal generator 14 and connected to the evaluation circuit at the input 17 of the evaluation circuit 10. The signal generator 14 can involve a "1-of-n decoder", which is controlled by a microcontroller 18 through a data line 20. The microcontroller 18 can be of type "8051", for example, which sends a counter state between 0 and n at predetermined intervals, for example 0.25 seconds, to the 1-of-n decoder 14. Corresponding to counter state x (x is a value between 0 and n), the 1-of-n decoder 14 switches output Yx to logical "high," while the other outputs remain "low." If the input 17 of the microcontroller 18 is then at the value logically "high," then the corresponding conducting path 8 is undamaged, and a tooth break is not assumed. If, in contrast, the value at input 17 to the microcontroller 18 is "low," then it can be assumed from this that the conducting path 8 and thereby the corresponding tooth 4 is damaged. The microcontroller 18 is in a position to record damaged teeth 4 and compare the stored values to each other. If it is determined in this manner that, for example, 3 or more non-adjacent teeth are damaged, then a maintenance signal is sent for replacement of the comb plate 2. If a break is detected in two adjacent teeth 4, then a STOP signal is sent, for example through a serial interface 22, to the control system of the people mover.

Figure 2:
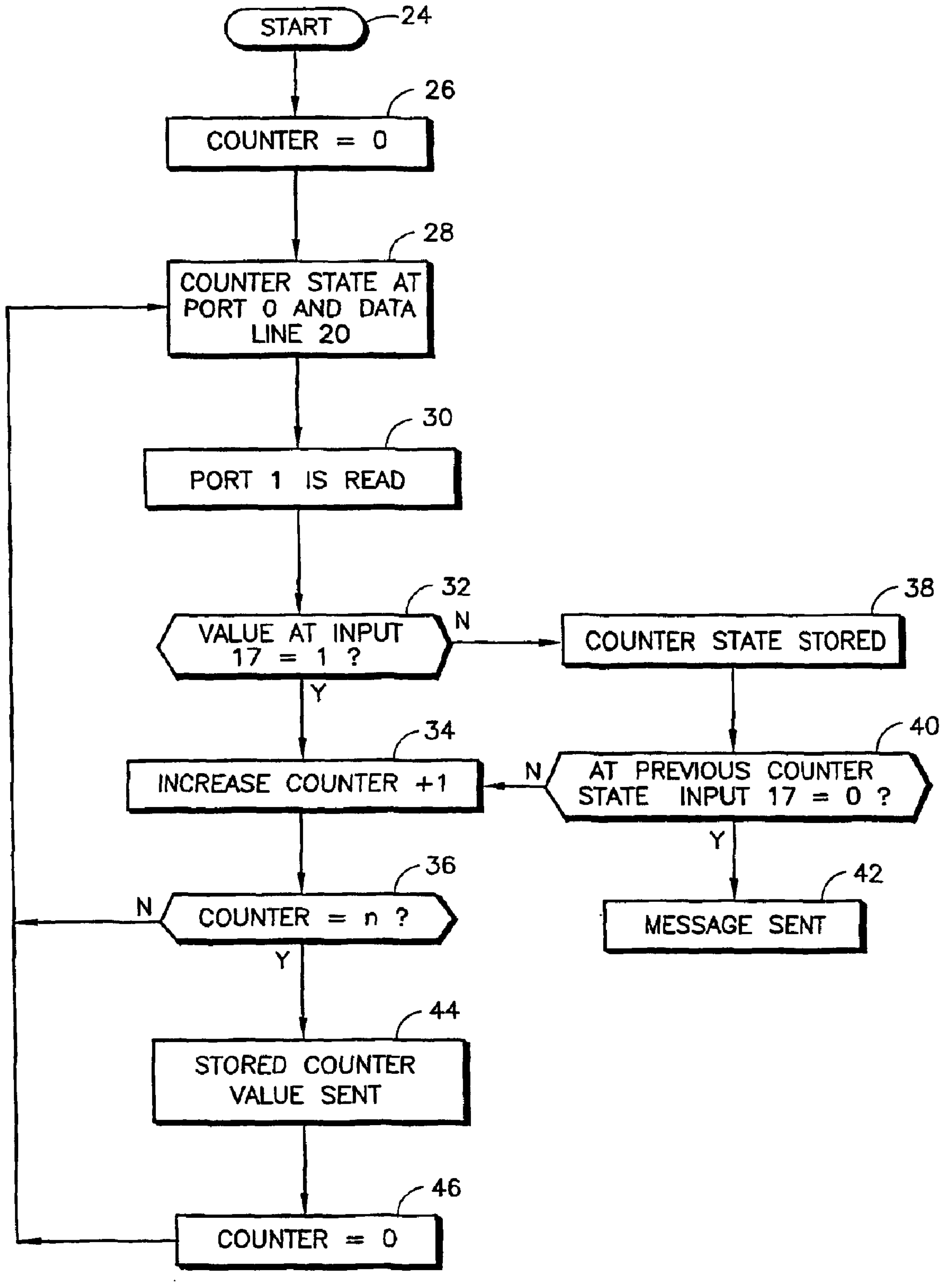
FIG. 2 shows a block diagram of the test procedure in the tooth-break monitoring device of FIG. 1.
Figure 4A:
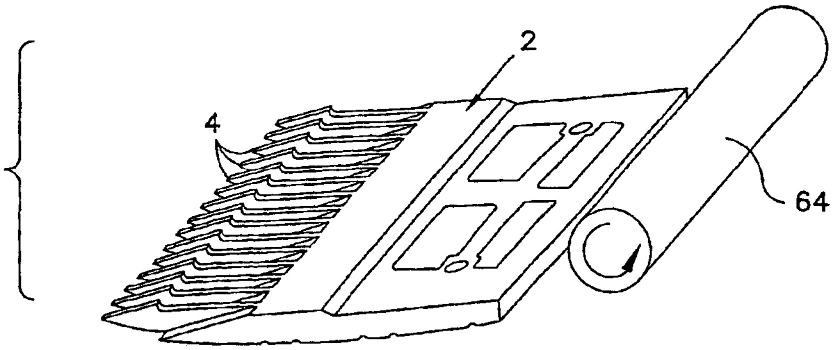
Figure 4B:
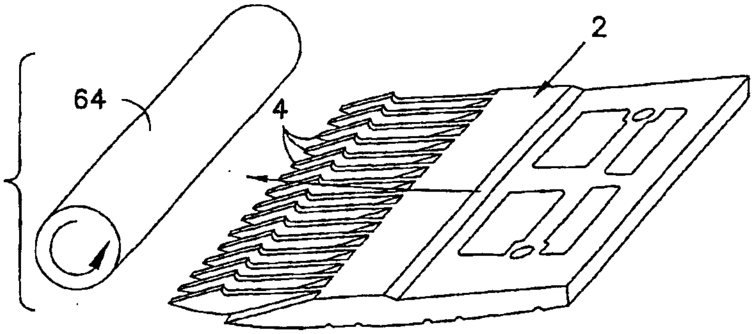
Figure 4C:
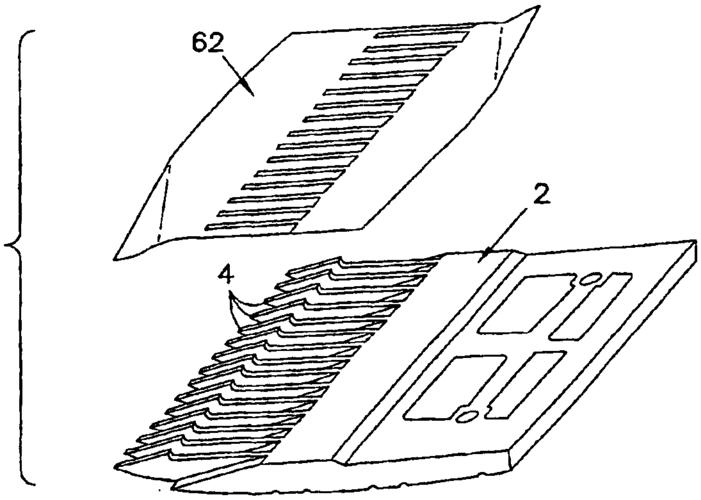
Figure 4C:
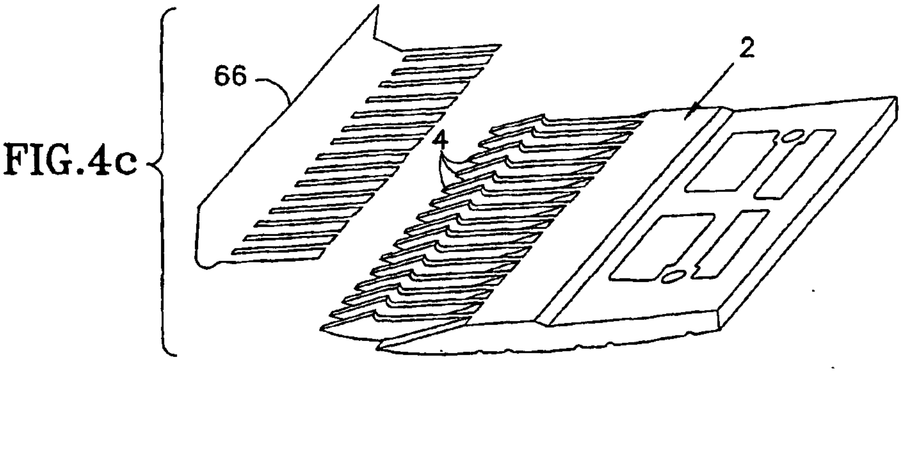

A possible test procedure for the tooth-break monitoring device of FIG. 1 is shown in the block diagram of FIG. 2. At the start 24 of the test procedure, the counter state 26 is equal to zero. The counter state is given at 28 to port and the data line 20. Then port 1, i.e. the input 17 to the microcontroller 18 is read at 30 and the value at the input 17 is checked at 32. If it is equal to one, then the counter state is increased by one at 34 and a check is made at 36 whether the counter [state] is equal to n. If the counter state is not yet equal to n, then the counter state, now increased by one, is sent at 28 to port 0 and the procedure is repeated. If it is determined at 32 that value applied to the input 17 of the microcontroller is not equal to one, i.e. it is "low," the corresponding counter state is stored at 38. At 40, a check is made whether the value at the input 17 of the microcontroller was zero at the previous counter state, i.e. the previous tooth was broken. If so, it is determined that two neighboring teeth are broken and at 42 a message is sent to the control of the people mover. If the previous tooth was not broken, then in step 34 the counter state is increased by one and another check is made at step 36 whether the counter state is already equal to n. If the counter state is equal to n in step 36, then the stored counter value, i.e. the counter state value at which the tooth is broken, is sent to the control in step 44 and subsequently, in step 46, the counter state is set to zero, after which, the individual values 0 through n are gone through again, starting with step 26.

Figure 3:
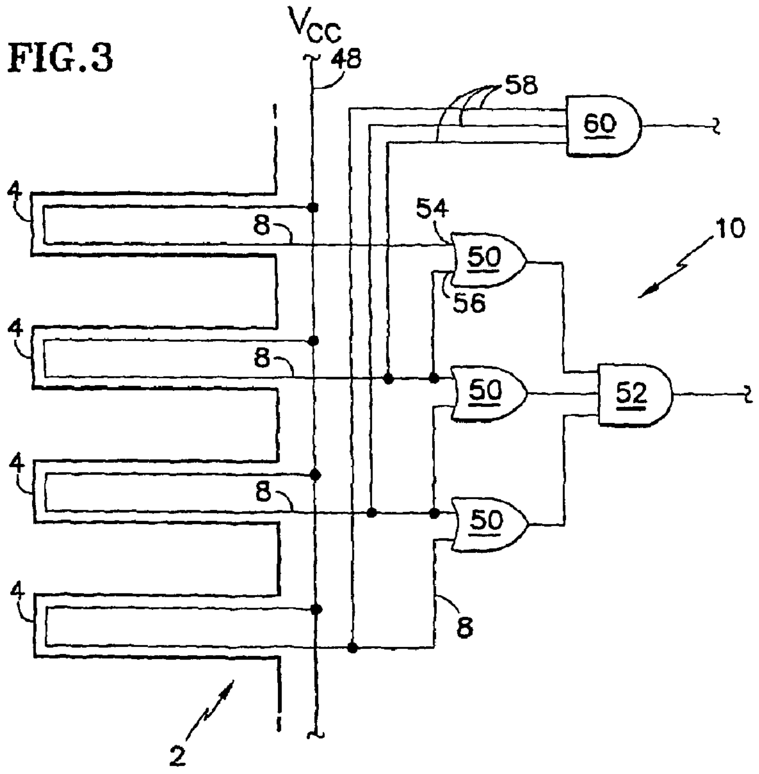
FIG. 3 shows schematically a comb plate according to the invention with an alternative embodiment of a tooth-break monitoring device.

In FIG. 3, a comb plate 2 with teeth 4 is shown. The evaluation circuit 10 can also be seen. The comb plate 2 has a conducting rail 48, from which individual conducting paths 8 branch, each of which goes through a tooth 4 to the evaluation circuit 10. The evaluation circuit shown consists of OR gates 50 and an AND gate 52. The conducting paths 8 of each pair of two adjacent teeth go to an OR gate 50. The outputs of the individual OR gates go to an AND gate 52.

A test voltage is applied to the conducting-path rail 48. The output of an OR gate 50 is logically "correct" if the test voltage is present at one of the two inputs 54, 56 of the OR gate 50. This means that, in case one of the two teeth 4 of a pair of adjacent teeth is broken, the output signal of the corresponding OR gate 50 is nevertheless logically "correct." Only in case two adjacent teeth are broken is the test voltage not present at the two inputs 54, 56 and the output of the OR gate is logically "false." The individual outputs of the OR gates 50 are applied to the inputs of the AND gate 52. In case only one of the inputs of the AND gate 52 is logically "false," the output of the AND gate 52 is logically "false." If the output of the AND gate 52 is logically "false," this means a break in two adjacent teeth 4 and a stop signal is given correspondingly to the system.

In order to establish whether an individual tooth 4 is broken in the comb plate 2, branch lines 58 can be led, for example, from the conducting paths 8 to an AND gate 60. If the output is logically "false," then this is a signal for a broken tooth 4. The outputs of the AND gates 52, 60 can be led, for example, to the control system of the people mover.

The conducting paths 8, 58 can be provided, for example, on a carrier film 62. The carrier film 62 can involve a PCB film, for example, which has an adhesive coating on one side. The film 62 can therefore serve simultaneously as a carrier for the adhesive and as an insulator for the conducting paths. The conducting paths can either be glued to the film 62 separately or, alternatively, the conducting paths can be applied by a photolithographic process or another process of printing technology. Likewise, the evaluation circuit 10 can already be provided on the film 62. For example, individual components of the evaluation circuit 10 can be attached in the manner of SMD components on the film 62 and connected to the conducting paths.

In FIG. 4, a process is shown for applying a monitoring device 6 to a comb plate 2 in a people mover. In the uppermost diagram of FIG. 4*a*, the comb plate 2 is shown. Its lower side can be seen in particular. The comb plate 2 has teeth 4. A roller 64 can also be seen, with which adhesive can be applied to the relevant regions of the comb plate 2. In FIG. 4*b*, the process for applying the adhesive with the adhesive roller 64 has ended. In FIG. 4*c*, the film 62 is positioned with the tooth-break monitoring device through the lower side of the comb plate 2. Here, the usual positioning techniques from lithographic processes can be used favorably. In FIG. 4*d*, the film 62 has been glued to the comb plate 2 and the cut 66 from the film is removed.

The finished comb plate 2 according to FIG. 4*d* can be mounted in the people mover. The electric contact between the conducting plates on the comb plate 2 and/or the evaluation circuit on the comb plate 2 and, for example, the control of the people mover can be produced either through a cable-plug connection or, for example, through contact surfaces pressed against corresponding contact elements on the people mover.

What is claimed is:

1. A comb plate (2) for use in a people mover with a step belt, comprising:

a base plate;

a number of teeth (4) arranged on it essentially parallel to one another, which mesh in use with grooves provided on the step belt of a people mover, wherein the con b plate (6) has an upper side that is exposed and a lower side that is concealed in use; and an electric tooth-break monitoring device (6) that is constructed in such a way that when two adjacent ones of the teeth (4) are broken, a warning signal is generated that is not generated if only one of the teeth (4) is broken.

2. A comb plate (2) according to clam 1, wherein the monitoring device (6) comprises at leant one conducting path (8) on the lower side of the comb plate (2), which goes through at least one tooth (4) through its region that is susceptible to breakage.

3. A comb plate (2) according to claim 2, wherein the conducting paths (8) are provided for all of the teeth (4) of the comb plate (2).

4. A comb plate (2) according to claim 2, further comprising an evaluation circuit (10) that is connected to the at least one conducting patl (8).

5. A comb plate (2) according to claim 2, further comprising:

an evaluation circuit (10); and a conducting-path rail (48), from which the at least one conducting path (8) branches, goes through the region of the at least one tooth (4), and is connected to the evaluation circuit (10).

6. A comb plate (2) according to claim 5 wherein the conducting paths (8) of adjacent ones of the teeth (4) are connect to an OR gate (50) for each pair of teeth and the outputs of the OR gates (50) are connected to an AND gate (52).

7. A comb plate (2) according to claim 2, wherein several of the conducting paths (8) are connected to a signal generator (14) that can generate a characteristic signal for each conducting path (8), and opposite ends of the conducting paths (8) are connect to an input of an evaluation circuit (10).

8. A comb plate (2) according to claim 7, wherein the signal generator (14) is constructed so as to give only one signal to each conducting path (8).

9. A comb plate (2) according to claim 2, wherein the conducting path (8) extends essentially through the entire length of the at least one tooth (4).

10. A comb plate (2) according to claim 2, wherein the conducting path (8) is glued to the comb plate (2).

11. A comb plate (2) according to claim 10, wherein the conducting pith (8) is glued onto the comb plate (2) with a flexible film (2).

12. A comb plate (2) according to claim 11, wherein the film (62) is a PCB film.

13. A comb plate (2) according to claim 10, further comprising an evaluation circuit (10) that is connected to the at least one conducting path (8), wherein electronic components of the evaluation circuit (10) are glued onto the comb plate (2) with a flexible film (62).

14. A people mover with a step belt, comprising a comb plate (2) according to one of claims 1 and 2–13.

* * * * *